US012559134B2

(12) United States Patent
Koenig et al.

(10) Patent No.: US 12,559,134 B2
(45) Date of Patent: Feb. 24, 2026

(54) COMPUTER-IMPLEMENTED METHOD AND SYSTEM FOR VERIFYING A SOFTWARE-BASED BEHAVIOR PLANNER OF AN AUTOMATED DRIVING FUNCTION

(71) Applicant: Robert Bosch GmbH, Stuttgart (DE)

(72) Inventors: Lukas Koenig, Grossbottwar (DE);
Michael Hanselmann,
Korntal-Muenchingen (DE); Michael Messer, Adolzfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 150 days.

(21) Appl. No.: 18/527,122

(22) Filed: Dec. 1, 2023

(65) Prior Publication Data

US 2024/0190464 A1     Jun. 13, 2024

(30) Foreign Application Priority Data

Dec. 7, 2022     (DE) ..................... 10 2022 213 188.6

(51) Int. Cl.
*B60W 60/00* (2020.01)
*B60W 40/04* (2006.01)
(52) U.S. Cl.
CPC .......... *B60W 60/001* (2020.02); *B60W 40/04* (2013.01); *B60W 2554/80* (2020.02); *B60W 2556/00* (2020.02)
(58) Field of Classification Search
CPC ............... B60W 40/04; B60W 60/001; B60W 2554/80; B60W 2556/00; G06F 11/3608;
(Continued)

(56) References Cited

U.S. PATENT DOCUMENTS

| | | | | |
|---|---|---|---|---|
| 2021/0370978 A1* | 12/2021 | Molinari | ............ | B60W 60/0011 |
| 2022/0063651 A1* | 3/2022 | Dai | ..................... | B60W 60/001 |

(Continued)

FOREIGN PATENT DOCUMENTS

| | | | | | |
|---|---|---|---|---|---|
| CN | 114834451 A | * | 8/2022 | ......... | B60W 60/001 |
| CN | 114834460 A | * | 8/2022 | ............ | B60W 50/00 |

(Continued)

OTHER PUBLICATIONS

Spin, "Verifying Multi-Threaded Software With Spin," Spinroot, 1991, pp. 1-3. <http://spinroot.com/spin/whatispin.html>.
(Continued)

*Primary Examiner* — Atul Trivedi
(74) *Attorney, Agent, or Firm* — NORTON ROSE FULBRIGHT US LLP

(57) ABSTRACT

A computer-implemented method for verifying a software-based behavior planner of an automated driving function. The method includes: providing a verification environment model to limit the state space of the behavior planner according to a specifiable traffic scene; providing a formal requirement as a criterion for the correctness of decisions of the behavior planner; generating a model checker representation of the behavior planner taking into account the provided verification environment model; analyzing the model checker representation using a model checking procedure with respect to the formal requirement. The verification environment model is used to determine a physically meaningful parameter interval for at least one location parameter and/or movement parameter of the participants of the given traffic scene. The model checking procedure systematically samples the parameter interval and thus checks the behavior planner for a representative selection of the possible temporal and spatial developments of the given traffic scene.

15 Claims, 5 Drawing Sheets

(58) Field of Classification Search

CPC ............ G06F 11/3688; G06F 11/3696; G06F 11/3698

USPC .......................................................... 701/23

See application file for complete search history.

(56) References Cited

U.S. PATENT DOCUMENTS

| | | | | |
|---|---|---|---|---|
| 2022/0089152 A1* | 3/2022 | Oh | ......................... | B60W 40/04 |
| 2022/0097688 A1* | 3/2022 | Hanselmann | ....... | B60W 30/095 |
| 2022/0171401 A1* | 6/2022 | Usman | ................. | G05D 1/0221 |
| 2022/0176988 A1* | 6/2022 | Wang | ...................... | G06V 20/56 |
| 2022/0291690 A1* | 9/2022 | Goyal | ................. | B60W 60/001 |
| 2022/0306152 A1* | 9/2022 | Zhang | .............. | B60W 60/0017 |
| 2022/0306156 A1* | 9/2022 | Wray | ................... | G06V 20/588 |
| 2022/0382279 A1* | 12/2022 | Wray | ................... | G05D 1/0088 |
| 2024/0078790 A1* | 3/2024 | Sundareshan | ........ | G06V 10/454 |
| 2024/0101121 A1* | 3/2024 | Jing | .................. | B60W 50/0097 |
| 2024/0103522 A1* | 3/2024 | Djuric | ............ | B60W 60/00272 |
| 2024/0174255 A1* | 5/2024 | Wang | .................. | B60W 60/001 |
| 2024/0184948 A1* | 6/2024 | Shu | ........................... | G06F 30/15 |
| 2024/0190463 A1* | 6/2024 | Phillips | ................. | B60W 30/09 |
| 2024/0290208 A1* | 8/2024 | Wei | ...................... | B60W 40/04 |
| 2024/0359705 A1* | 10/2024 | Zhang | ................... | B60W 40/02 |
| 2025/0078531 A1* | 3/2025 | Yan | ......................... | G06V 10/82 |
| 2025/0124794 A1* | 4/2025 | Ravella | ................ | G08G 1/0133 |
| 2025/0162616 A1* | 5/2025 | Woelki | ................... | G06N 3/047 |

FOREIGN PATENT DOCUMENTS

| | | | | | |
|---|---|---|---|---|---|
| CN | 116975781 A | * | 10/2023 | ........... | G06F 18/253 |
| DE | 102017006338 A1 | | 1/2019 | | |
| DE | 102018128890 A1 | | 5/2020 | | |
| DE | 102020210964 A1 | | 3/2022 | | |
| DE | 102021201212 A1 | | 8/2022 | | |
| FR | 3093052 A1 | * | 8/2020 | ...... | B60W 30/18163 |
| GB | 2606796 A | * | 11/2022 | ......... | B60R 21/0136 |
| GB | 2621205 A | * | 2/2024 | ....... | B60W 60/0011 |

OTHER PUBLICATIONS

"NUSMV: A New Symbolic Model Checker," NUSMV, pp. 1-4. <http://nusmv.fbk.eu/>.

"Finite-state machine" Wikipedia, 1 page; accessed on Sep. 19, 2023; URL: https://en. wikipedia. org/w/ indexphptitle=Finitestate_machine&oldid=1123320568.

* cited by examiner

COMPUTER-IMPLEMENTED METHOD AND SYSTEM FOR VERIFYING A SOFTWARE-BASED BEHAVIOR PLANNER OF AN AUTOMATED DRIVING FUNCTION

CROSS REFERENCE

The present application claims the benefit under 35 U.S.C. § 119 of German Patent Application No. DE 10 2022 213 188.6 filed on Dec. 7, 2022, which is expressly incorporated herein by reference in its entirety.

BACKGROUND INFORMATION

The present invention relates to a computer-implemented method for verifying a software-based behavior planner of an automated driving function. The decisions and planning of such a behavior planner are based on a runtime environment model which describes the temporal and spatial development of a traffic scene on the basis of location and movement parameters of participants of the traffic scene. These location and movement parameters are ascertained with the aid of a perception module. For this purpose, the perception module typically processes measurement data of a plurality of sensors of different sensor modalities, such as inertial sensors, video, radar and/or LiDAR sensors. The perception module can also use information from a position determination system (GNSS) to ascertain the location and movement parameters of traffic participants.

The verification method discussed here comprises at least the following steps:

providing a verification environment model to limit the state space of the behavior planner according to a specifiable traffic scene, providing a formal requirement as a criterion for the correctness of decisions of the behavior planner, generating a model checker representation of the behavior planner taking into account the provided verification environment model and analyzing the model checker representation using a model checking procedure with respect to the formal requirement.

Testing the correctness of the implementation is a necessary part of the industrial development process of software components for an automated driving function, such as the behavior planners. This evaluation is currently usually test-based, and uses methods such as simulation-based testing or Replay-HiL (hardware in the loop) solutions. However, test-based methods generally do not guarantee that errors will be discovered or that the tested software component will always provide error-free results with respect to predefined requirements and boundary conditions.

Techniques and tools for model checking and probabilistic model checking, which is a formal verification method, are moreover described in the scientific literature. A model checker checks all possible execution options of a software or a model of the software against a mathematically precisely formulated requirement. This involves checking whether all possible versions of the software meet this requirement. This makes it possible to formally prove mathematically whether the software or the model of the software is error-free with respect to the formulated requirement. Examples of model checking tools to be mentioned here include SPIN (http://spinroot.com/spin/whatispin.html) and NuSMV (http://nusmv.fbk.eu/).

To use the conventional model checking tools, the native program code of the software component to be verified has to be translated into a model checker representation having the structure of a finite automaton. Given the scope and complexity of software components of an automated driving function, this translation should be carried out in as automatically a manner as possible. The native program code of the software component to be verified is therefore limited to a set of permissible operations of the programming language being used, wherein an operation is considered permissible if it can be represented as a finite automaton.

The use of model checking to verify software components, such as the behavior planners, proves to be very advantageous in practice. First of all, this method can be used to provide formal proof of correctness, which plays an important part in the approval of automated driving functions. In the event that the proof of correctness fails, model checking can be used to identify counterexamples, i.e., constellations in which the software component to be verified does not provide the desired result, i.e. in which the formal requirements formulated for the model checking are not met. Moreover, when the software component to be verified is translated into the model checker representation preserving the code structure, model checking procedures can identify those portions of the native program code that are responsible for non-compliance with the formal requirements. Model checking can thus also advantageously be used in the context of software development.

The existing approaches for verifying software-based behavior planners by model checking are based on a static verification environment model that neither takes into account error tolerances of the perception module when ascertaining location and movement parameters nor the multitude of different possibilities for the development of the traffic scene, in particular due to the non-deterministic behavior of the respective traffic participants.

SUMMARY

A verification method according to the present invention takes these "uncertainties" into account by using the verification environment model to determine at least one physically meaningful parameter interval for at least one location parameter and/or movement parameter of the participants of the given traffic scene. This at least one parameter interval is then taken into account in the analysis of the model checker representation of the behavior planner in that the model checking procedure systematically samples this parameter interval and thus checks the behavior planner for a representative selection of the possible temporal and spatial developments of the given traffic scene.

It is essential here that not only the limits of these parameter intervals are considered, but also location or movement parameters that lie within these intervals, because limit value considerations do not necessarily describe the "worst case" or "best case" scenario, in particular in more complex traffic situations. According to an example embodiment of the present invention, the sampling of the parameter intervals is carried out systematically, so that the model checker can check a representative selection of the possible temporal and spatial developments of the given traffic scene. The state space of the behavior planner is thus systematically expanded with respect to existing uncertainties in the location and/or movement parameters. Whether the parameter intervals are sampled uniformly or non-uniformly for this purpose, and how many sampling values are needed for a representative selection, depends on the individual case.

In an advantageous example embodiment of the present invention, the determination of the physically meaningful parameter interval for at least one location parameter and/or movement parameter is based on the accuracy with which the perception module provides the behavior planner with the at least one location parameter or movement parameter.

The correctness check thus takes into account that the input values of the behavior planner to be verified are subject to a "measurement uncertainty". This is primarily due to the measurement errors of the individual sensors of the perception module. The individual measurement errors are propagated in the fusion and processing of the sensor data in the perception module, so that the location parameters and the movement parameters provided to the behavior planner are fraught with a determinable error. In this embodiment of the present invention, therefore, the error intervals determined for the perception module used can just be used as physically meaningful parameter intervals.

According to an example embodiment of the present invention, alternatively or additionally, the determination of the physically meaningful parameter interval for at least one location parameter and/or movement parameter can be based on physically plausible assumptions of the verification environment model about the possible behavior of the respective participant. Possible interactions between mobile participants of the traffic scene are disregarded. The physically plausible assumptions of the verification environment model about the possible behavior of the respective participant are instead limited to the physical possibilities of the individual participants independently of one another, such as maximum acceleration and location and speed data derived from this, if necessary taking into account map information about the course of the road, obstacles, etc. Physically plausible "occupiable spaces" for the individual participants are thus identified for the temporal and spatial development of the traffic scene and determined as physically meaningful parameter intervals.

The method according to the present invention is particularly suitable for verifying a behavior planner for the traffic situations: lane changing, lane merging, entering or exiting expressways or freeways, behavior at intersections and in the vicinity of traffic lights.

BRIEF DESCRIPTION OF THE DRAWINGS

Advantageous embodiments of the present invention will be explained in more detail in the following in conjunction with the figures and with reference to examples.

DETAILED DESCRIPTION OF EXAMPLE EMBODIMENTS

Figure 1:
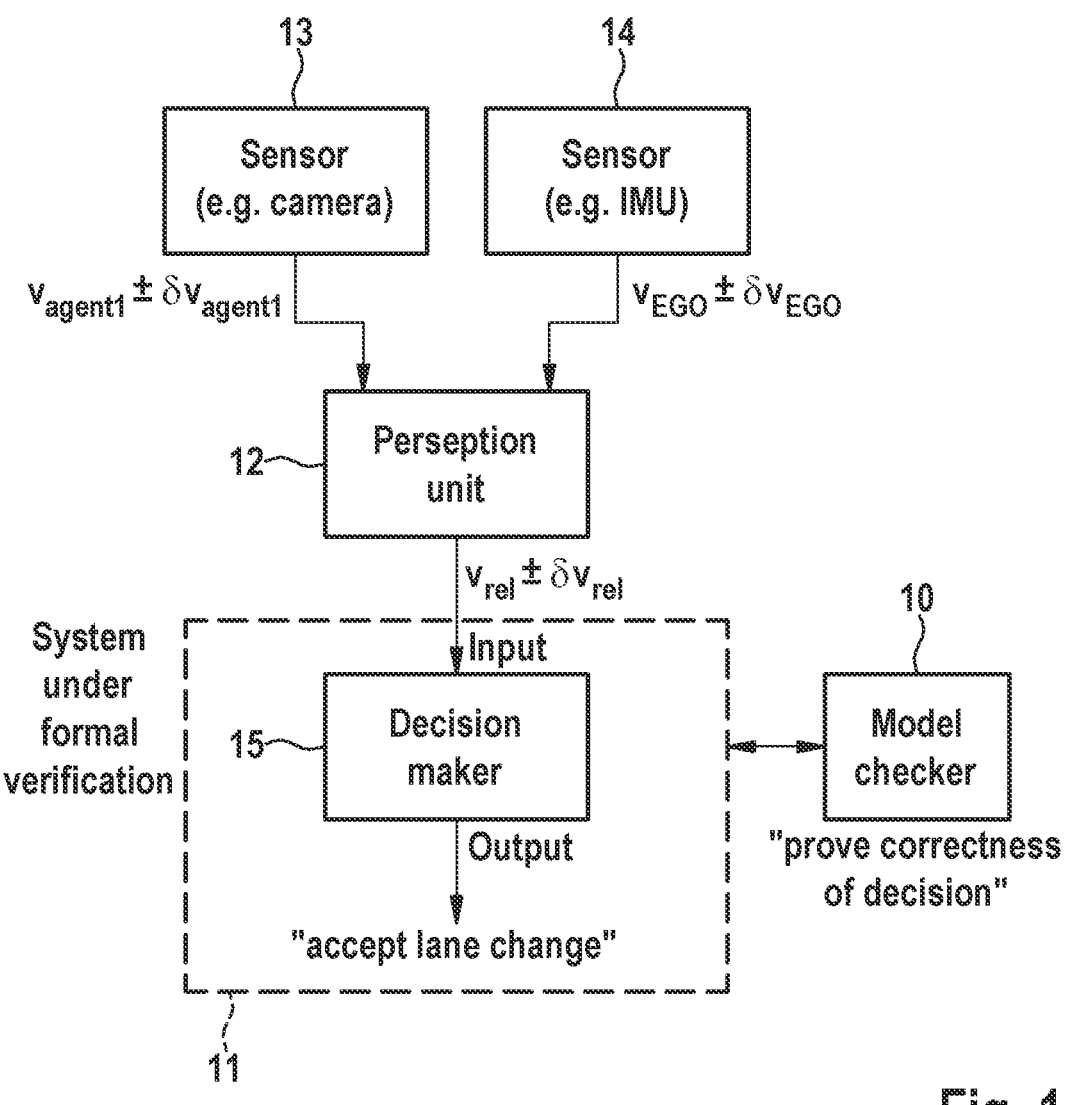
FIG. 1 illustrates the task of the verification method according to the present invention using a block diagram.

The block diagram of FIG. 1 illustrates the test scope of the method 10 according to the present invention for verifying a software-based behavior planner 15 of an automated driving function using the example of a lane change function. The decision of the behavior planner 15 whether a lane change should be initiated or not (output of the behavior planner 15) is based on a runtime environment model that describes the respective current traffic situation on the basis of sensor data and is continuously updated. A perception module 12, which collects, fuses and processes the sensor data from a plurality of sensors 13, 14, is provided for this purpose. A camera 13 and an IMU (inertial measurement unit) 14 are shown here as examples for the sensors 13, 14. The IMU 14 provides speed parameters $v_{EGO}+/-\delta_{vEGO}$ of the EGO vehicle, i.e., the vehicle that is equipped with the behavior planner 15. The camera 13 provides speed parameters $v_1+/-\delta_{v1}$ of another traffic participant agent1. The sensor data $v_{EGO}$ and $v_1$ are subject to sensor-related errors or are subject to a sensor-specific uncertainty $\delta_{vEGO}$ or $\delta_{v1}$. The perception module 12 processes this speed information and provides the relative speed $v_{rel}+/-\delta_{vrel}$ between the EGO vehicle and the other traffic participant agent1 as part of the runtime environment model. Since the uncertainties of the sensor data propagate, the relative speed $v_{rel}$ is likewise fraught with uncertainty $\delta_{vre}$.

The intent is to use the model checker-based verification method 10 according to the present invention to formally check whether the behavior planner 15 "always" makes the "correct" lane change decision, so that the creation of a dangerous situation by the lane change decision of the behavior planner 15 can be ruled out. In the context of the present invention, "always" means for all possible manifestations of the environment model of the present traffic situation; in this case, therefore, for all possible relative speeds between the EGO vehicle and the other traffic participant agent1 (input of the behavior planner 15) taking into account the uncertainty $\delta_{vre}$ of the relative speed $v_{rel}$. This test scope is illustrated in FIG. 1 by the system limitation 11.

The behavior planner 15 makes the decision whether or not to initiate a lane change ("accept lane change") or not ("stay in lane") at a point in time $t_{decision}$, based on the following rule:

IF distance (EGO,agent1)<x AND $v_{rel}$ (EGO, agent1)>y: STAY-IN-LANE

If the distance between the EGO vehicle and the other vehicle agent1 is less than a specified minimum distance x and/or the relative speed between the EGO vehicle and the other vehicle agent1 exceeds a specified value y, then no lane change is initiated. Or conversely: a lane change is initiated only if the distance between the EGO vehicle and the other vehicle agent1 is greater than a specified minimum distance x and the relative speed between the EGO vehicle and the other vehicle agent1 is less than a specified value y.

The method according to the present invention now checks whether given formal safety requirements are met in every case when this rule is applied. A minimum distance between the EGO vehicle and the other vehicle agent1 after the lane change could be specified as a safety requirement, for instance. The test is carried out for all possible developments in the traffic scene, i.e. for all possible distances and relative speeds between the EGO vehicle and the other vehicle agent1 provided by the environment model, taking into account the respective uncertainties. To do this, both the interval of the possible distances and the interval of the possible relative speeds have to be discretized in a suitable manner.

Figure 2:
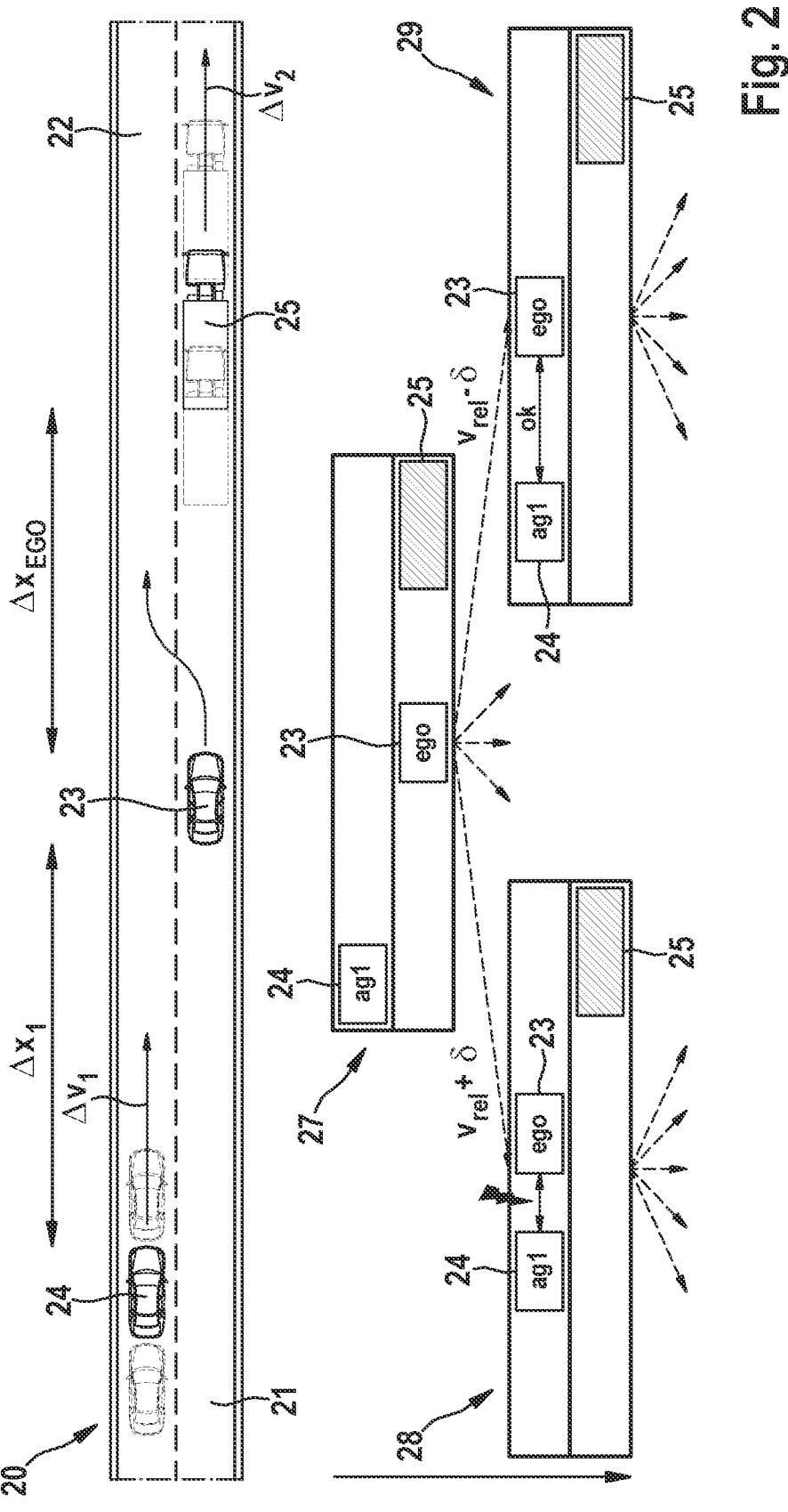
FIG. 2 shows a first variant of the verification method according to the present invention using the example of a behavior planner for a lane change.

The upper half of FIG. 2 shows that the sensor-related uncertainties when acquiring the speeds of the individual traffic participants also affect the prediction of the position of these traffic participants for a later point in time as well as the determination of relative speeds and result in corresponding uncertainties. To illustrate this, FIG. 2 shows a roadway 20 having two travel lanes 21, 22 in the same direction. An EGO vehicle 23 is traveling in the right lane 21 at the speed $v_{EGO}+/-\Delta v_{Ego}$ and is approaching a preceding truck 25 having the speed $v_2+/-\Delta v_2$. The decision to be made is whether a lane change of the EGO vehicle 23 from the right lane 21 to the left lane 22, which is also referred to as the target lane 22, can safely be initiated. Another vehicle 24 is approaching the EGO vehicle 23 from behind in the left lane 22 at the speed $v_1+/-\Delta v_1$. The uncertainties in the speeds $v_1$ and $v_{EGO}$ lead to corresponding uncertainties $\Delta x1$ and $\delta x_{EGO}$ in the position determination of the vehicles 23 and 24, which is indicated by the respective double arrows in the upper half of FIG. 2.

The lower half of FIG. 2 illustrates the approach according to the present invention for taking these uncertainties into account. In the context of the verification method according to the present invention, a verification environment model is used, which determines a respective physically meaningful parameter interval for the location and movement parameters of the participants of the given traffic scene. In the embodiment example described here, this parameter interval is determined in such a way that the uncertainties in the position determination $\Delta x_{EGO/1}$ and also in the speed determination $\Delta v_{EGO/1}$ as well as in the determination of relative speeds are covered. These parameter intervals are then taken into account in the analysis of the model checker representation of the behavior planner in that the model checking procedure systematically samples these parameter intervals and thus checks the behavior planner for a representative selection of the possible temporal and spatial developments of the given traffic scene. Thus the non-deterministic behavior of input variables can be checked as well when a behavior planner is verified using model checking tools.

To illustrate this procedure, three diagrams 27, 28, 29 are shown in the lower half of FIG. 2. The diagram 27 shows the positions of the vehicles 23, 24, 25 as in the initial scene shown in the upper half of FIG. 2. The arrows originating from the EGO vehicle 23 in the diagram 27 indicate that the diagrams 28, 29 show only two examples from a representative selection of possible developments of the initial scene that result from the uncertainties of the position and the speed of the EGO vehicle 23 and are tested according to the present invention. The diagram 28 thus shows a case in which a lane change initiated in accordance with the rules leads to a violation of safety requirements, namely to falling below a specified minimum distance between the EGO vehicle and the following vehicle after the lane change of the EGO vehicle. due to the uncertainty $\delta_{rel}$ in the determination of the relative speed $v_{rel}$. In the case of diagram 29, in contrast, this specified minimum distance is upheld so that this safety requirement is met.

The procedure according to the present invention differs significantly from a deterministic approach in which only worst case estimates are considered, i.e., the specific states of the behavior planner corresponding to the interval limits with their transitions. The approach according to the present invention is more generic and is therefore also suitable for more complex situations in which worst case scenarios cannot readily be identified. Since the model checker checks all possible developments of the initial scene, the method according to the present invention allows a clear statement whether the decisions of the behavior planner about a lane change are safe in every case to be made. If this is not the case, the model checker can identify both the sensors that are not precise enough and the program parts of the behavior planner that contribute to non-compliance with the safety requirements.

Figures 3A, 3B:
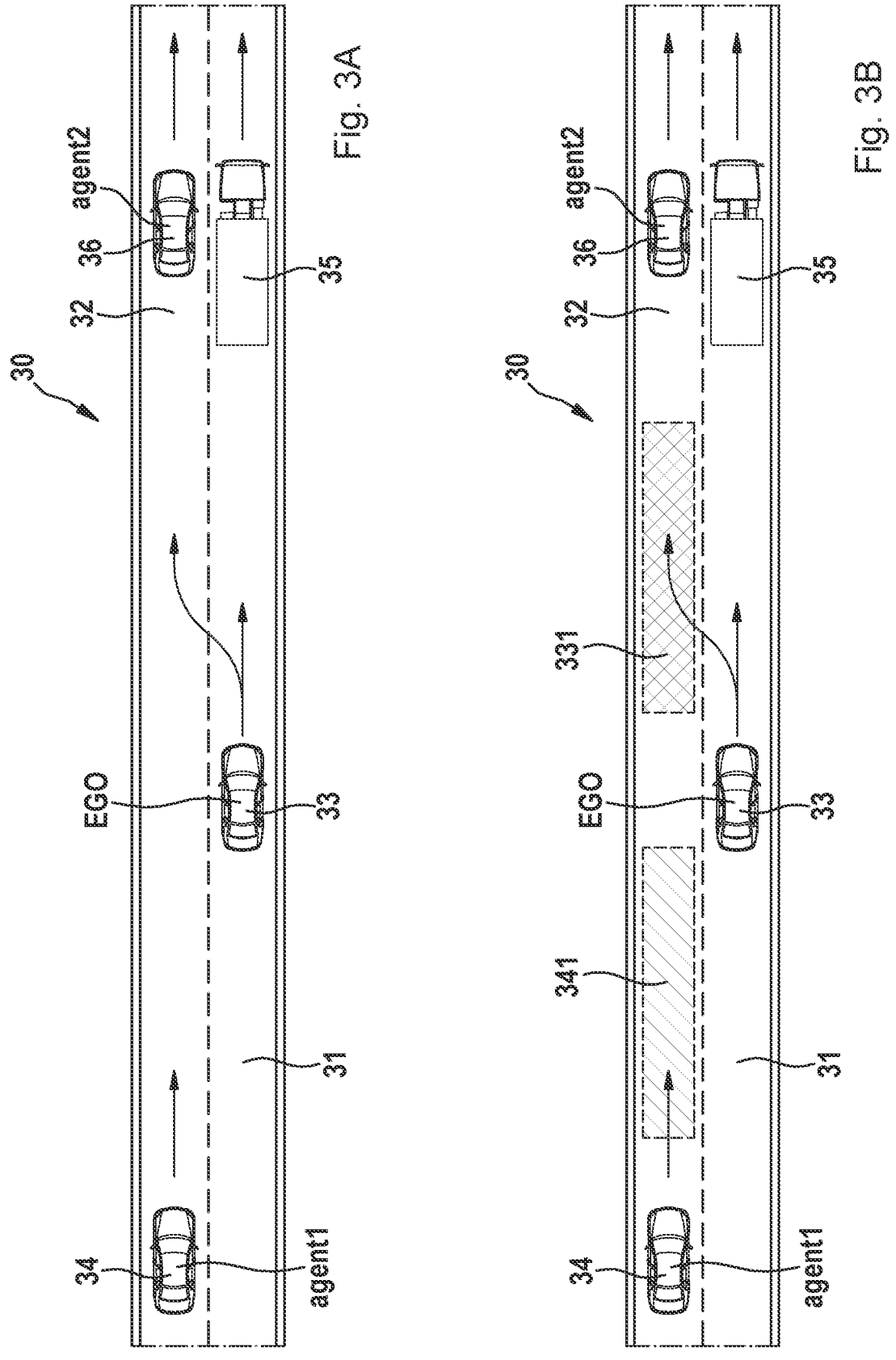
FIGS. 3A, 3B show a second variant of the verification method according to the present invention using the example of a behavior planner for a lane change.
Figure 4:
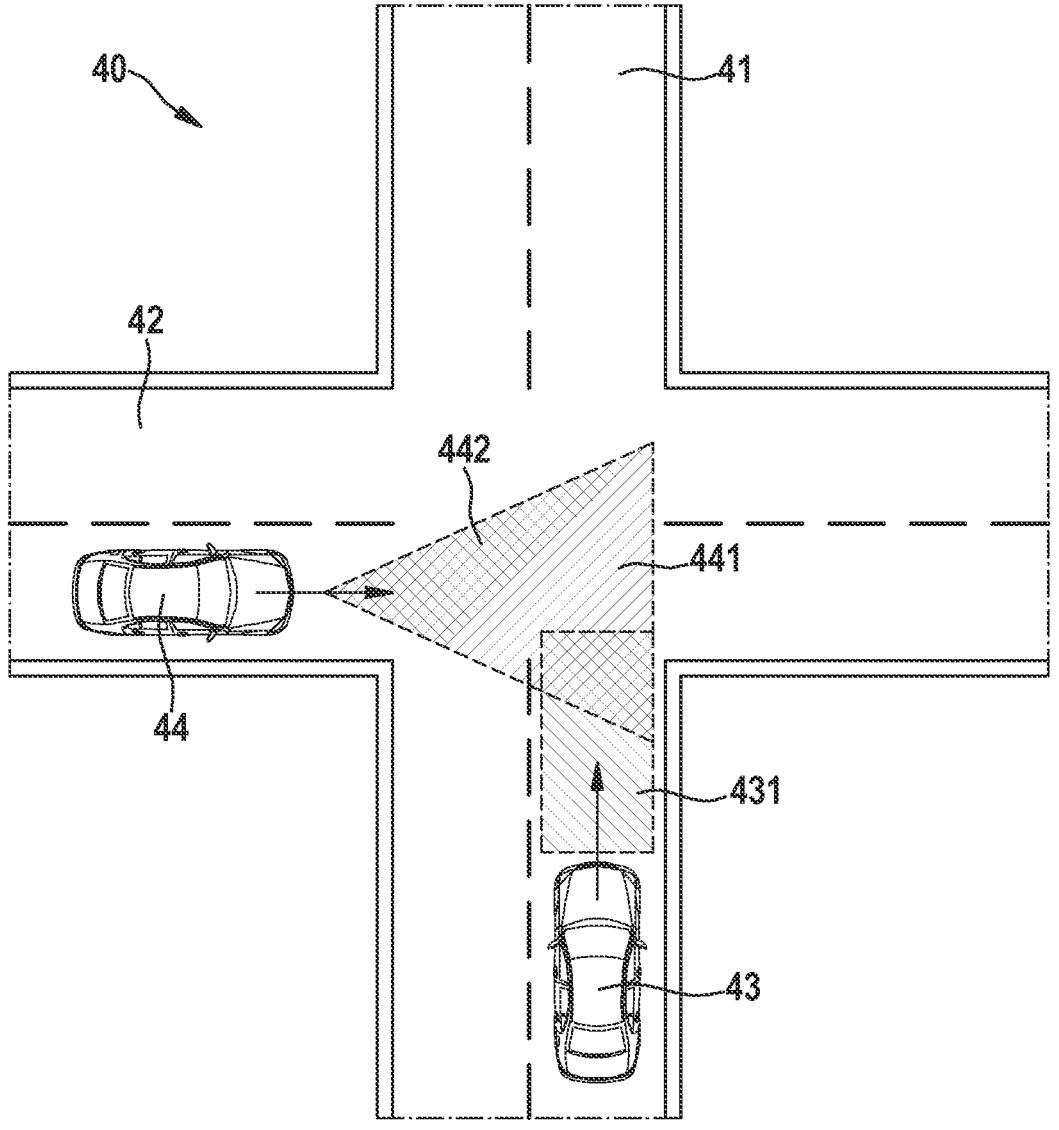
FIG. 4 shows the second variant of the verification method according to the present invention using the example of a behavior planner for behavior at intersections.
Figure 5:
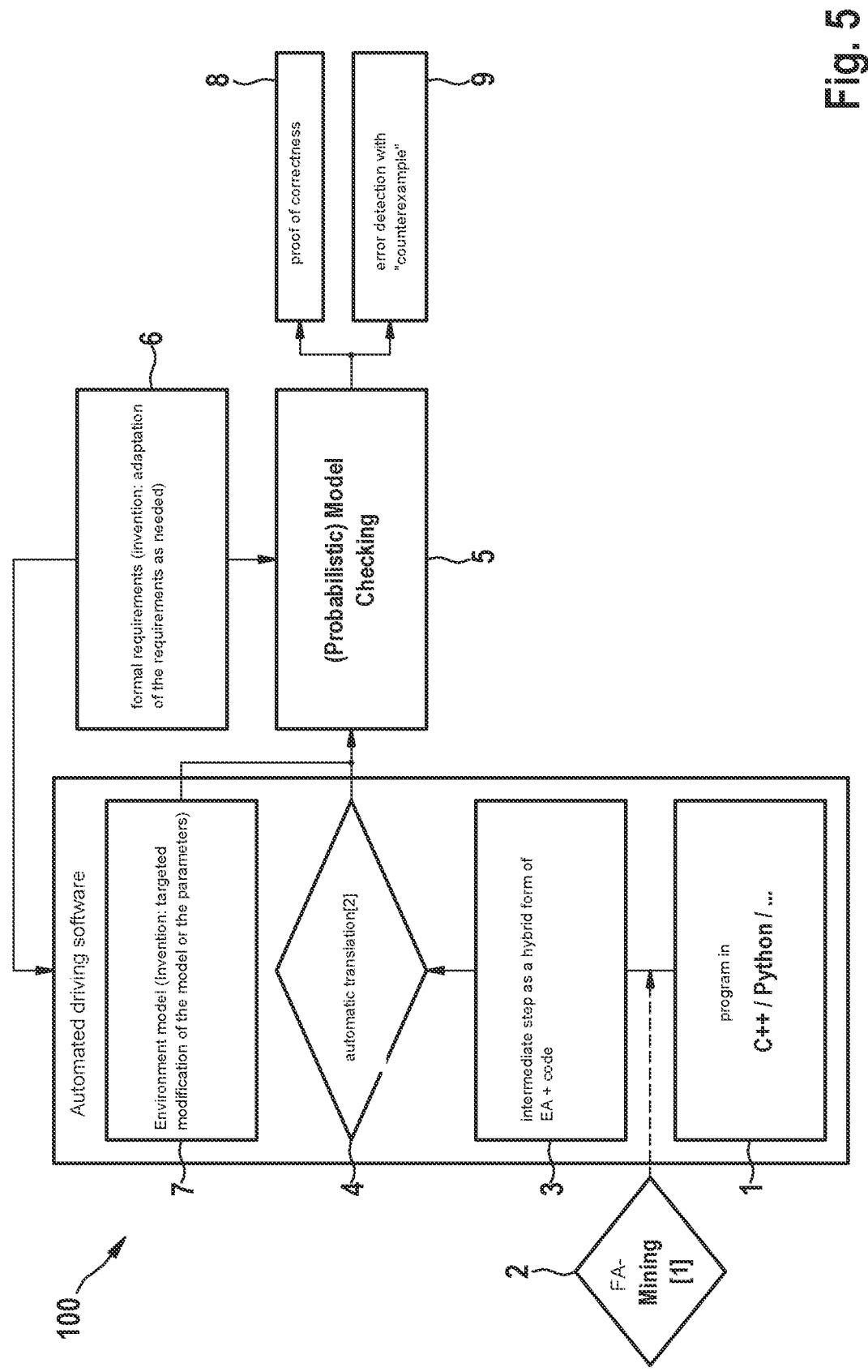
FIG. 5 shows a block diagram of a computer-implemented system according to the present invention for verifying a software-based behavior planner of an automated driving function.

The application examples for the verification method according to the present invention shown in FIGS. 3 to 5 relate to the more complex class of "in traffic" model checking. Here, the environment around the EGO vehicle serves as a discriminating input for the behavior planner the correctness of which is to be verified. All of the behavior planners of the embodiment examples described here are monitors for an automated driving function. A monitor decides whether a specific automated driving function, e.g. a lane change function, can be activated in a specific traffic situation. The verification method according to the present invention is used to check whether the monitor makes a correct decision with respect to a given formal requirement for all modeled traffic situations.

The application example shown in FIGS. 3A, 3B relates to a behavior planner that decides whether to initiate a lane change of the EGO vehicle, specifically according to the same rules as the behavior planner 1 described above in connection with FIG. 1 and FIG. 2. FIG. 3A shows an initial traffic scene, according to which there is an EGO vehicle 33 in the right lane 31 of a roadway 30 having two travel lanes 31, 32 in the same direction. The EGO vehicle 33 is moving at the speed $v_{EGO}$ and is approaching a preceding truck 35. Here too, the decision to be made is whether a passing maneuver via a lane change of the EGO vehicle 33 from the right lane 31 to the target lane 32 can safely be initiated. A first other vehicle 34 is approaching the EGO vehicle 33 from behind in the left lane 32 at the speed v1. There is also a second other vehicle 36 in the left lane 32 at the level of the truck 35.

This initial traffic scene is modeled with the verification environment model of the method according to the present invention. Map information, for example about the course of the road and the topology of the environment, is typically taken into account as well. The verification environment model serves to limit the state space of the behavior planner, specifically according to the given traffic scene. According to the present invention, the verification environment model is also used to determine at least one physically meaningful parameter interval for at least one location parameter and/or movement parameter of the participants of the given traffic scene. According to the present invention, this at least one parameter interval is then taken into account in the analysis of the model checker representation of the behavior planner in that the model checking procedure systematically samples this parameter interval and thus checks the behavior planner for a representative selection of the possible temporal and spatial developments of the given traffic scene. In the embodiment example described here, physically meaningful parameter intervals are determined for the possible positions and speeds of the EGO vehicle 33 and the first other vehicle 34. This determination is based on physically plausible assumptions of the verification environment model about the maximum change in position and speed within a time t. FIG. 3B illustrates the procedure according to the present invention by means of the hatched areas 331 and 341. The area 341 is delimited by the min/max positions of the first other vehicle 34, which have been determined assuming a maximum deceleration and acceleration and the current speed of the vehicle 34. The corresponding area 331 of the EGO vehicle 33 should typically be less long since the EGO vehicle 33 can control its own movement.

The method according to the present invention now checks whether the formal requirement that a specified minimum distance to the following other vehicle 34 will be maintained after the lane change of the EGO vehicle 33 is met in every case when the rule of the behavior planner is applied. This test is carried out for all possible developments of the traffic scene as outlined by the areas 331 and 341; i.e., for all possible resulting distances and relative speeds between the EGO vehicle and the other vehicle 24. For this purpose, the respective intervals of the distances and relative speeds are discretized in a suitable manner.

The "in traffic" model checker described here also checks all possible developments of the initial scene and thus enables a clear statement whether the decisions of the behavior planner about a lane change are safe in every case to be made. If this is not the case, the model checker can identify both problematic developments in the initial scene and the program parts of the behavior planner that contribute to non-compliance with the safety requirements.

FIG. 4 shows the second variant of the above-described variant of the verification method according to the present invention using the example of a behavior planner for behavior at intersections. This behavior planner is intended to ensure that the EGO vehicle only enters the intersection when no other traffic participant is present.

In the initial traffic scene, an EGO vehicle 43 and another vehicle 44 are approaching the intersection 40 of two intersecting roads 41 and 42. The EGO vehicle 43 is on the road 41 and the other vehicle 44 is on the road 42, so that, from the perspective of the EGO vehicle 43, the other vehicle 44 is approaching from the left.

In this case too, the verification environment model can be used as part of the verification method according to the present invention to determine physically meaningful parameter intervals for the possible positions and speeds of the EGO vehicle 43 and the other vehicle 44. This determination is based on physically plausible assumptions of the verification environment model about the maximum change in position and speed within a time t. The hatched areas 431, 441 and 442 illustrate the procedure according to the present invention. The area 431 describes the possible positions of the EGO vehicle. The rectangular shape results from the intended straight-ahead travel of the EGO vehicle and the requirement to brake for the right-of-way rule "right before left". The area 441 and the subarea 442 describe the possible positions of the other vehicle 44. While the shape of the area 441 takes into account all possible directions of travel of the other vehicle 44, the subarea 442 assumes a "turn left" intention.

The method according to the present invention now checks whether the formal requirement that there is no other traffic participant in the intersection when the EGO vehicle enters the intersection is met in every case when the rules of the behavior planner are applied. This test is carried out for all possible developments of the traffic scene as outlined by the areas 431 and 441 or 442. For this purpose, the respective intervals of the affected location and movement parameters are discretized in a suitable manner.

It should expressly be noted here that this variant of the method according to the present invention is also suitable for verifying other functions of a behavior planner, such as for decisions in the following traffic situations: behavior in the vicinity of traffic lights, accelerating or braking in the lane, passing maneuvers, driving on country roads, expressways and freeways, lane merging, entering or exiting expressways or freeways, etc.

FIG. 5 shows a system 100 according to the present invention for verifying a software-based behavior planner of an automated driving function, wherein the behavior planner is in the form of a native program code 1, for example in the programming language C++ or Python.

The verification method according to the present invention provides for translating the native program code 1 of the behavior planner into a model checker representation. To do this, the system 10 comprises a translation module that substantially preserves the code structure of the native program code when translating it into a model checker representation. Blocks 2 and 4 are provided for this purpose. The prerequisite for such a translation to be completely automatic is that the native program code only contains operations that can themselves be represented as a finite automaton. Accordingly, the native program code 1 may not use all of the available operations of the respective programming language, but only a subset of the available operations. In the case of C++ or Python programs, for example, all loop/GoTo/recursion structures are omitted.

The native program code 1 is first converted into a finite automaton (FA), the states and state transitions of which can be clearly assigned to the code structure of the native program code, in order to then generate a model checker representation based on this finite automaton so that, when translated into the model checker representation, the code structure of the native program code is substantially preserved. It should be noted here that, in certain cases, the thus generated finite automaton can already be used as a model checker representation, i.e. as an input for the model checker. In these cases, no further translation step is required.

In the embodiment example according to FIG. 6, the conversion of native program code 1 into a finite automaton is carried out in two steps. In the first step, the so-called mining block 2, EA-like structures of a specific type are detected in the native program code. Corresponding FA states and FA state transitions are, likewise automatically, assigned to the automatically detected FA-like program structures. This involves generating an intermediate representation 3 of the native program code. This intermediate representation 3 already has the structure of a finite automaton, but one in which the structure of the native program code is preserved. The remaining portions of the native program code are embedded in the FA structure of the intermediate representation 3. These so-called code portions of the intermediate representation 3 are then again automatically converted to FA portions in a further step 4. This creates a finite automaton that fully represents the native program code and in which the structure of the native program code is preserved. This finite automaton can then be either translated into a model checker representation or used directly for model checking.

The application of a model checking procedure to the model checker representation of the behavior planner is carried out in a model checker module 5 and is used to analyze the software implementation of the behavior planner with respect to compliance with a formal requirement. A formal requirement often includes a formal description of the driving situations, as well as safety-related requirements and rules that the implemented function has to comply with. Model checking can in particular be used to prove that the requirement-specifically safety-related rules—is correctly met for all possible configurations. The formal requirement is specified using a requirements module 6.

The system 100 shown in FIG. 5 further comprises an environment modeling module 7 that models the physical properties of the environment, the driving behavior of the other traffic participants and other external system parameters and provides them as a verification environment model. The verification environment model in particular describes the temporal and spatial development of a specifiable traffic scene based on location and movement parameters of participants of the traffic scene. According to the present invention, the environment modeling module 7 is configured to determine at least one physically meaningful parameter interval for at least one location parameter and/or movement parameter of the participants of the given traffic scene on the basis of the verification environment model. The thus provided verification environment model generates boundary conditions that limit the state space of the behavior planner. This is taken into account when translating the native program code 1 into a model checker representation, so that the model checker representation is limited by the boundary conditions of the verification environment model.

The model checker module 5 is configured to take this at least one physically meaningful parameter interval for at least one location parameter and/or movement parameter into account in the analysis of the model checker representation of the behavior planner in that the model checking procedure systematically samples this parameter interval and thus checks the behavior planner for a representative selection of the possible temporal and spatial developments of the given traffic scene.

To output the results of the model checker analysis, the system 100 comprises an output module-here Blocks 8 and 9. Block 8 indicates whether or not the behavior planner is in compliance with the given formal requirement, which is referred to as "proof of correctness".

In the event of non-compliance with the given formal requirement, Block 9 provides at least one counterexample in the form of a traffic situation in which the behavior planner does not meet the given formal requirements. This could be accomplished by displaying and replaying a counterexample, for example.

Block 9 also provides the identification of those portions of the native program code of the behavior planner to which the non-compliance can be attributed.

This information can then be used by a developer for targeted modification of the behavior planner.

What is claimed is:

1. A computer-implemented method for verifying a software-based behavior planner of an automated driving function, the method comprising the following steps:
   providing a verification environment model to limit a state space of the behavior planner according to a specifiable traffic scene;
   providing a formal requirement as a criterion for correctness of decisions of the behavior planner;
   generating a model checker representation of the behavior planner taking into account the provided verification environment model;
   analyzing the model checker representation using a model checking procedure with respect to the formal requirement, wherein the verification environment model is used to determine at least one physically meaningful parameter interval for at least one location parameter and/or movement parameter of participants of the traffic scene, the at least one parameter interval being taken into account in the analysis of the model checker representation of the behavior planner in that the model checking procedure systematically samples the at least one parameter interval and checks the behavior planner for a representative selection of possible temporal and spatial developments of the traffic scene;
   determining, based on the analyzing, whether the behavior planner is in compliance with the formal requirement; and
   outputting, based on the determining, an indicator indicating whether the behavior planner is in compliance with the formal requirement.

2. The method according to claim 1, wherein the decisions and planning of the behavior planner are based on a runtime environment model which describes the temporal and spatial development of the traffic scene based on the at least one location parameter and/or movement parameter of participants of the traffic scene that are ascertained using a perception module, the determination of the physically meaningful parameter interval for the at least one location parameter and/or movement parameter is based on the accuracy with which the perception module provides the behavior planner with the at least one location parameter and/or movement parameter.

3. The method according to claim 2, wherein the method is used for verifying the behavior planner of a lane change function,
   wherein a decision to initiate a lane change of an ego vehicle equipped with the behavior planner from a current travel lane to a target lane is made using the corresponding runtime environment model,
   wherein at least a distance and a relative speed between the ego vehicle and another vehicle following the ego vehicle in the target lane are taken into account, and
   wherein the distance and the relative speed are determined based on location parameters and speeds of the ego vehicle and the other vehicle ascertained by the perception module;
   wherein a respective parameter interval for the distance and/or the relative speed is taken into account in the analysis of the model checker representation of the behavior planner, wherein each respective parameter interval for the distance and/or the relative speed is determined based on an accuracy with which the perception module provides the distance or the relative speed to the behavior planner.

4. The method according to claim 3, wherein the analysis of the model checker representation of the behavior planner takes into account a respective parameter interval for the location parameters and/or movement parameters of the ego vehicle and the other vehicle which are determined based on physical assumptions of the verification environment model about the temporal and spatial developments of the specifiable traffic scene.

5. The method according to claim 1, wherein the determination of the physically meaningful parameter interval for the at least one location parameter and/or movement parameter is based on physically plausible assumptions of the verification environment model about possible behavior of a respective participant of the traffic scene.

6. The method according to claim 1, wherein the method is used for verifying the behavior planner in at least one of the following traffic situations: i) lane merging, or ii) entering or exiting expressways or freeways, or iii) behavior at intersections and in a vicinity of traffic lights.

7. The method according to claim 1, wherein the physically meaningful parameter interval is determined based on one or more error tolerances associated with the at least one location parameter and/or movement parameter of the participants of the traffic scene.

8. The method according to claim 1, further comprising:

outputting an indicator indicating that the behavior planner is in non-compliance with the formal requirement;

determining at least one counterexample in which the behavior planner does not meet the given formal requirement, the at least one counterexample being determined in the form of a traffic situation; and outputting the at least one counterexample.

9. The method according to claim 8, further comprising displaying the at least one counterexample.

10. The method according to claim 1, wherein the generating the model checker representation of the behavior planner further includes translating a plurality of code segments of the behavior planner, wherein the determining includes determining that the behavior planner is in non-compliance with the formal requirement, the method further comprising:

identifying one or more code segments of the plurality of code segments to which the non-compliance can be attributed; and outputting the identified one or more code segments.

11. A computer-implemented system for verifying a software-based behavior planner of an automated driving function, comprising:

an environment modeling module configured to provide a verification environment model which describes a temporal and spatial development of a specifiable traffic scene based on location and movement parameters of participants of the traffic scene;

a requirements module configured to specify a formal requirement as a criterion for correctness of decisions of the behavior planner in the traffic scene;

a translation module configured to generate a model checker representation of the behavior planner taking into account the provided verification environment model;

a model checker module configured to analyze the model checker representation using a model checking procedure with respect to the given formal requirement, wherein the environment modeling module is configured to determine at least one physically meaningful parameter interval for at least one location parameter and/or movement parameter of participants of the traffic scene based on the verification environment model, and the model checker module is configured to take the at least one parameter interval into account in the analysis of the model checker representation of the behavior planner in that the model checking procedure systematically samples the at least one parameter interval and checks the behavior planner for a representative selection of possible temporal and spatial developments of the traffic scene;

a compliance module configured to determine, based on analyzing the model checker representation, whether the behavior planner is in compliance with the formal requirement; and an output module configured to output an indicator indicating whether the behavior planner is in compliance with the formal requirement.

12. The system according to claim 11, wherein the physically meaningful parameter interval is determined based on one or more error tolerances associated with the at least one location parameter and/or movement parameter of the participants of the traffic scene.

13. The system according to claim 11, wherein the output module outputs an indicator indicating that the behavior planner is in non-compliance with the formal requirement, and wherein:

the compliance module is further configured to determine at least one counterexample in which the behavior planner does not meet the given formal requirement, the at least one counterexample being determined in the form of a traffic situation, and the output module is further configured to output the at least one counterexample.

14. The system according to claim 13, further comprising:

a display module configured to display the at least one counterexample.

15. The system according to claim 11, wherein:

the translation module is further configured to, as part of the generating the model checker representation of the behavior planner, translate a plurality of code segments of the behavior planner, the compliance module is further configured to identify one or more code segments of the plurality of code segments to which the non-compliance can be attributed, and the output module is further configured to output the identified one or more code segments.

* * * * *